(12) United States Patent
Joseph et al.

(10) Patent No.: US 11,242,773 B2
(45) Date of Patent: Feb. 8, 2022

(54) REVERSIBLE CAMSHAFT TARGET

(71) Applicant: VITESCO TECHNOLOGIES GMBH, Hannover (DE)

(72) Inventors: Fabien Joseph, Toulouse (FR); Stéphane Eloy, Toulouse (FR)

(73) Assignee: VITESCO TECHNOLOGIES GMBH, Hannover (DE)

(*) Notice: Subject to any disclaimer, the term of this patent is extended or adjusted under 35 U.S.C. 154(b) by 0 days.

(21) Appl. No.: 17/271,999

(22) PCT Filed: Aug. 28, 2019

(86) PCT No.: PCT/EP2019/073017
§ 371 (c)(1),
(2) Date: Feb. 26, 2021

(87) PCT Pub. No.: WO2020/043802
PCT Pub. Date: Mar. 5, 2020

(65) Prior Publication Data
US 2021/0189916 A1    Jun. 24, 2021

(30) Foreign Application Priority Data

Aug. 29, 2018  (FR) ...................................... 1857745

(51) Int. Cl.
*F01L 1/047* (2006.01)
*F02B 75/18* (2006.01)
*G01D 5/244* (2006.01)
(52) U.S. Cl.
CPC .............. *F01L 1/047* (2013.01); *F02B 75/18* (2013.01); *G01D 5/244* (2013.01);
(Continued)
(58) Field of Classification Search
CPC ..... F01L 2820/041; F01L 1/344; F01L 1/352; F01L 1/047; F01L 2820/04; G01D 1/145
See application file for complete search history.

(56) References Cited

U.S. PATENT DOCUMENTS

2004/0007054 A1   1/2004  Makino et al.
2005/0160803 A1   7/2005  Adachi et al.
(Continued)

FOREIGN PATENT DOCUMENTS

EP       0602692 A2 *  6/1994    ........... G01D 5/2457
JP       H01-100350    4/1989
(Continued)

OTHER PUBLICATIONS

International Search Report for PCT/EP2019/073017 dated Oct. 24, 2019, 7 pages.
(Continued)

*Primary Examiner* — George C Jin
*Assistant Examiner* — Teuta B Holbrook
(74) *Attorney, Agent, or Firm* — Nixon & Vanderhye (57) ABSTRACT

Disclosed is a toothed wheel for a camshaft, forming a target for a camshaft position sensor, the toothed wheel including a circular body including two opposite main faces, and at least four teeth distributed around the circumference of the circular body, each tooth including two edges, one corresponding to a rising edge and the other to a falling edge, according to a direction of rotation of the wheel, the angular separation between the edges of each tooth being different for each tooth, characterized in that the four teeth are shaped so that the toothed wheel includes, considering the same main face and the same direction of rotation of the wheel: four edges of the same first rising or falling type spaced apart by 90° respectively, and three edges of the second falling or rising type respectively, spaced apart by 120° respectively.

20 Claims, 4 Drawing Sheets (52) U.S. Cl.
CPC . *F01L 2820/041* (2013.01); *F02B 2075/1812* (2013.01); *F02B 2075/1816* (2013.01)

(56) References Cited

U.S. PATENT DOCUMENTS

| | | | | |
|---|---|---|---|---|
| 2008/0210021 | A1* | 9/2008 | Steinruecken | G01D 5/2449 |
| | | | | 73/862.328 |
| 2009/0210137 | A1 | 8/2009 | Kokubo et al. | |
| 2013/0104635 | A1* | 5/2013 | Hoetzel | G01D 5/2492 |
| | | | | 73/114.26 |
| 2014/0360254 | A1 | 12/2014 | Deringer et al. | |
| 2015/0114097 | A1 | 4/2015 | Zouboff et al. | |
| 2015/0268065 | A1* | 9/2015 | Slama | G01D 5/244 |
| | | | | 123/90.31 |

FOREIGN PATENT DOCUMENTS

| | | |
|---|---|---|
| WO | 2015/058953 | 4/2015 |
| WO | 2019/243266 | 12/2019 |
| WO | 2020/099625 | 5/2020 |

OTHER PUBLICATIONS

Written Opinion of the ISA for PCT/EP2019/073017 dated Oct. 24, 2019, 6 pages.

\* cited by examiner

REVERSIBLE CAMSHAFT TARGET

CROSS-REFERENCE TO RELATED APPLICATIONS

This application is the U.S. national phase of International Application No. PCT/EP2019/073017 filed Aug. 28, 2019 which designated the U.S. and claims priority to FR 1857745 filed Aug. 29, 2018, the entire contents of each of which are hereby incorporated by reference.

TECHNICAL FIELD

The invention relates to a toothed wheel for a camshaft forming a target for a camshaft position sensor, suitable for three- or four-cylinder engines. The wheel is particularly suitable for use with a position sensor of the type capable of detecting a high or low level of the toothed wheel and detecting, on the basis of a change in level, a type of rising or falling edge of a tooth of the wheel.

PRIOR ART

In the operating cycle of an internal combustion engine, it is necessary to know the position of the crankshaft accurately in order to be able to synchronize different actions such as fuel injection, spark plug control, distribution member management, etc. This makes it possible to optimize the efficiency of combustion and reduce fuel consumption and toxic emissions.

To this end, a crankshaft conventionally includes a toothed wheel the teeth of which are detected by a sensor. The toothed wheel typically comprises a set of teeth distributed evenly around its circumference, with the exception of a reference portion devoid of teeth, also known as a gap. By detecting the teeth passing in front of the sensor and counting the number of teeth that have passed since the gap, it is possible to know the position of the crankshaft over a 360° turn.

One engine cycle corresponds to two complete rotations of the crankshaft, and it is therefore insufficient to determine the position of the engine solely on the basis of the crankshaft wheel.

This information is therefore combined with information about the angular position of the camshaft, which is rotated by the crankshaft and also includes a toothed wheel the teeth of which are detected by a corresponding sensor.

Whereas an engine cycle corresponds to two 360° rotations of the crankshaft, it only corresponds to one 360° rotation of the camshaft. As a result, the camshaft toothed wheel has a rotational asymmetry that, cross-referenced with the information about the position of the crankshaft, makes it possible to deduce the state of the engine cycle accurately.

Each time the engine is started, the engine is thus synchronized when the crankshaft gap is detected, combined with the detection of the state of the camshaft wheel.

Figure 1:
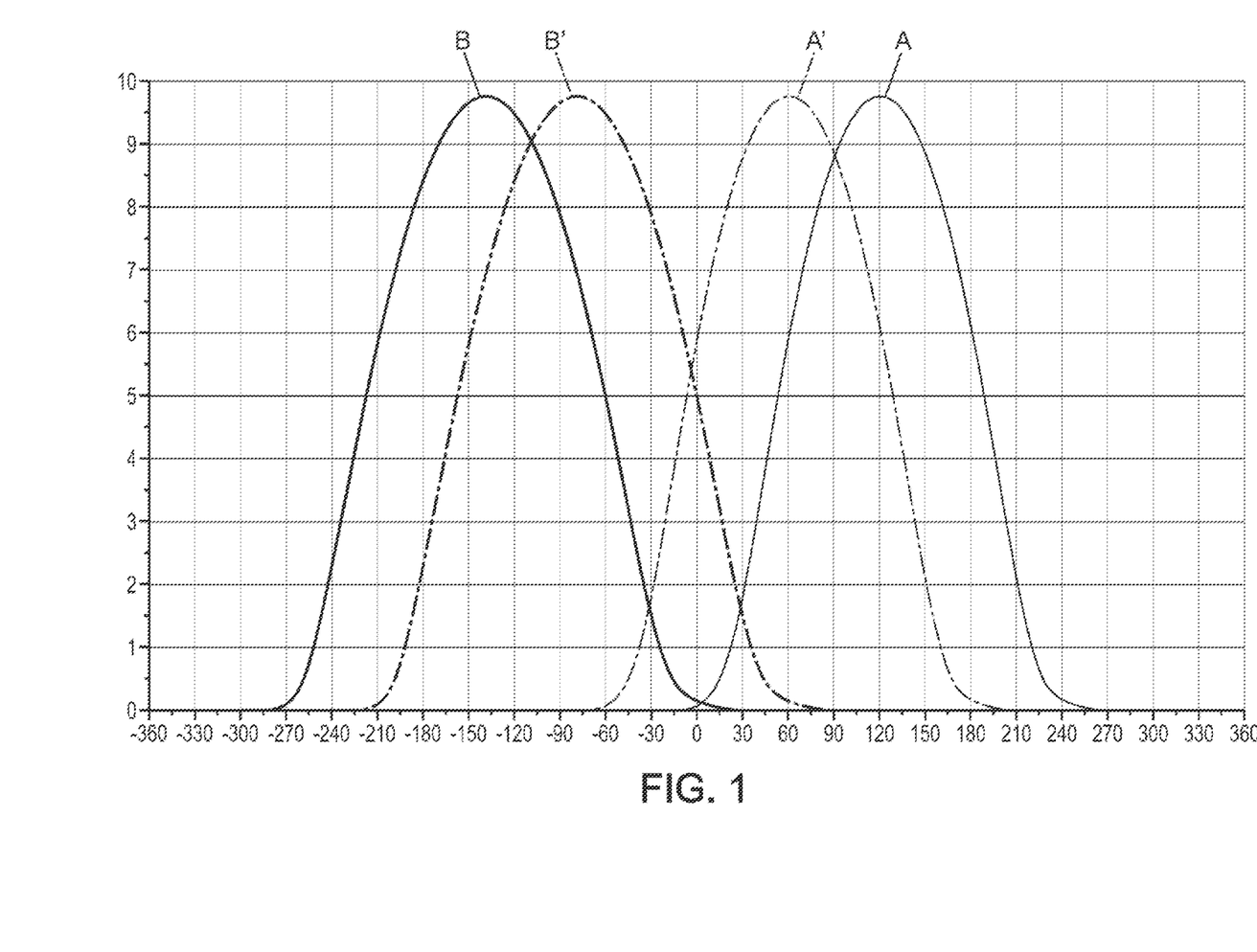
FIG. 1, described above, shows the displacement of the intake and exhaust valves as a function of the angular position of the camshaft to which they are connected.

With reference to FIG. 1, in an engine with Variable Valve Timing (VVT), provision can be made to offset the angular position of the intake camshaft and/or the exhaust camshaft relative to the crankshaft to cause exhaust gas recirculation in the cylinders, in order to reduce fuel consumption and emissions.

In FIG. 1, the x axis shows the angular position of the crankshaft in degrees (an angle of rotation of the crankshaft corresponding to double the corresponding rotation of the camshaft) and the y axis shows the displacement of the intake or exhaust valve in millimeters. The solid lines show the displacements of the intake (curve A) and exhaust (curve B) valves controlled respectively by the intake and exhaust camshafts by default, and the dashed lines show the offset of the angular position of the camshafts (curve A' for the intake valves and B' for the exhaust valves) to allow the existence of an overlap range between the opening phases of the intake and exhaust valves.

It is important that the design of a camshaft toothed wheel takes into account this possible offset so that the satisfactory synchronization with the information originating from the crankshaft toothed wheel is possible despite this potential offset.

In order to improve the performance of the synchronization and control of the variable valve timing, it is known practice to position teeth forming markers specific to each cylinder on the camshaft toothed wheel. For example, a camshaft toothed wheel of a four-cylinder engine can include four edges each spaced apart by 90°, each edge passing the sensor corresponding to the same position of the piston in each respective cylinder.

A single manufacturer uses several engines having a different number of cylinders on the different vehicles in its range. This results in a great variety of camshaft toothed wheels to manage, which increases the production cost of these wheels.

In addition, it should be noted that there are two types of camshaft position sensor, and two types of corresponding toothed wheel.

A first type, called a differential sensor, does not make it possible to detect a high level (corresponding to a tooth of the wheel) or a low level (corresponding to an interval between two teeth), but solely the change from one level to the other, that is, the rising or falling edges of the wheel.

In this case, the targets used include a potentially large number of teeth in order to comprise at least as many teeth as there are relevant edges to detect, all of the teeth having the same small size (the targets are also called pin targets). In this case, the sensor detects a single edge per tooth, always of the same rising or falling type. The number and spacing of the teeth make it possible to make a toothed wheel specific to a three- or four-cylinder engine.

A camshaft toothed wheel is known from US2014/360254 that is suitable for being used in conjunction with a differential sensor, and comprises at least one tooth at each of the following positions on its circumference: 0°, 60°, 90°, 120°, 180°, 240°, 270° and 300°. Each tooth comprises an edge that can be detected by a sensor.

This makes it possible to obtain a single wheel that is simultaneously compatible with four-cylinder engines (as the information corresponding to each cylinder is supplied by teeth 0°, 90°, 180° and 270°) and with three- and six-cylinder engines (information supplied by teeth 0° CAM, 60° CAM, 120° CAM, 180° CAM, 240° CAM, 300° CAM).

A second type of sensor, called a TPO (True Power On) sensor is suitable for detecting a high or low level of a toothed wheel, which makes it possible to deduce the passing of an edge. These sensors have superior accuracy in the detection of one type of edge, generally falling edges, but inferior accuracy in the detection of the other type of edge.

The targets used for this type of sensor generally include fewer teeth than the targets used for differential sensors as the high and low levels of the toothed wheel must be long enough to be able to be detected by the sensor, and in addition the rising and falling edges can be detected by the sensor. However, the lengths of the teeth vary and are generally greater than the length of a tooth of a target for a differential sensor. These targets are also called "level targets".

The document described above is not suitable for use with a TPO sensor.

DISCLOSURE OF THE INVENTION

In light of the above, one aim of the invention is to propose a toothed wheel for a camshaft that is compatible with engines comprising three or four cylinders, and that can be used with a TPO sensor capable of detecting a high or low level of a toothed wheel.

Another aim of the invention is to propose a toothed wheel allowing equally satisfactory synchronization performance with a three-cylinder engine as with a four-cylinder engine.

A further aim of the invention is to propose a toothed wheel for a camshaft that is compatible with a variable valve timing engine.

In this regard, the invention relates to a toothed wheel for a camshaft, forming a target for a camshaft position sensor, the toothed wheel comprising a circular body comprising two opposite main faces, and at least four teeth distributed around the circumference of the circular body, each tooth comprising two edges, one corresponding to a rising edge and the other to a falling edge, according to a direction of rotation of the wheel, the toothed wheel being characterized in that said at least four teeth are shaped so that the toothed wheel comprises, considering the same main face and the same direction of rotation of the wheel:

four edges of the same first rising or falling type spaced apart by 90° respectively, and three edges of the second falling or rising type respectively, spaced apart by 120° respectively, and in that it includes on its circumference at least two zones devoid of any rising or falling tooth edges respectively over an angle of at least 35°, the two zones being spaced apart by 180°, one of the two zones being situated in an interval between two teeth and the other zone being situated on a tooth.

Advantageously, but optionally, the angular separation between the edges of each tooth is different for each tooth.

Advantageously, but optionally, the toothed wheel comprises a marking element on one of two opposite main faces.

In one embodiment, with the minimum angular separation between one of the four edges spaced apart by 90° and one of the three edges spaced apart by 120° denoted as B, and the minimum angular separation between one of the four edges spaced apart by 90° and the fourth edge of the same type as those spaced apart by 120° denoted as C, the angular positions of the edges of the teeth of the toothed wheel are: [B, 90, B+120, 180, B+240, 270, 360-C, 360].

In one embodiment, each tooth corresponds to a high level of the toothed wheel and each interval between two teeth corresponds to a low level of the toothed wheel, the toothed wheel being suitable for forming a target for a camshaft position sensor of the type capable of detecting a high or low level of the tooth and for deducing the presence of a tooth edge from a change in level, the minimum angular separation B corresponds to a high level of the toothed wheel, and is defined by the following equations:

In one embodiment, with the minimum angular separation between one of the four edges spaced apart by 90° and one of the three edges spaced apart by 120° denoted as B, and the minimum angular separation between one of the four edges spaced apart by 90° and the fourth edge of the same type as those spaced apart by 120° denoted as C, the angular positions of the edges of the teeth of the toothed wheel are: [B, 90, B+120, 180, B+240, 270, 360-C, 360].

In one embodiment, each tooth corresponds to a high level of the toothed wheel and each interval between two teeth corresponds to a low level of the toothed wheel, the toothed wheel being suitable for forming a target for a camshaft position sensor of the type capable of detecting a high or low level of the tooth and for deducing the presence of a tooth edge from a change in level, the minimum angular separation B corresponds to a high level of the toothed wheel, and is defined by the following equations:

$$B > \tan^{-1}\left(\frac{L_{high}}{R}\right) \text{ and } 30 - B > \tan^{-1}\left(\frac{L_{low}}{r}\right)$$

where R is the radius of the toothed wheel including a height of the teeth relative to the circular body, r is the radius of the circular body, $L_{high}$ is the minimum distance between the edges of a tooth allowing the detection of the high level between the two edges by the sensor, and $L_{low}$ is the minimum distance between the edges of two consecutive teeth defining an interval allowing the detection of the low level between these edges by the sensor.

In this case, the angular separation C corresponds to a low level of the toothed wheel, and C is advantageously defined by the following equations:

$$C > \tan^{-1}\left(\frac{L_{low}}{r}\right) \text{ and } 90 - C > \tan^{-1}\left(\frac{L_{high}}{R}\right)$$

In one embodiment, each tooth corresponds to a high level of the toothed wheel and each interval between two teeth corresponds to a low level of the toothed wheel, the toothed wheel being suitable for forming a target for a camshaft position sensor of the type capable of detecting a high or low level of the toothed wheel and for detecting a tooth edge on the basis of a change in level, and the minimum angular separation B corresponds to a low level of the toothed wheel, and is defined by the following equations:

$$B > \tan^{-1}\left(\frac{L_{low}}{r}\right) \text{ and } 30 - B > \tan^{-1}\left(\frac{L_{high}}{R}\right)$$

where r is the radius of the circular body, R is the radius of the toothed wheel including a height of the teeth relative to the circular body, $L_{high}$ is the minimum distance between the edges of a tooth allowing the detection of the high level between the two edges by the sensor, and $L_{low}$ is the minimum distance between the edges of two consecutive teeth defining an interval allowing the detection of the low level between these edges by the sensor.

In this case, the angular separation C corresponds to a high level of the toothed wheel, and C is defined by the following equations:

$$C > \tan^{-1}\left(\frac{L_{high}}{R}\right) \text{ and } 90 - C > \tan^{-1}\left(\frac{L_{low}}{r}\right)$$

The invention also relates to an internal combustion engine comprising three or four cylinders, comprising a camshaft, a toothed wheel according to the preceding description rigidly mounted on the camshaft, in which each tooth corresponds to a high level of the toothed wheel and each interval between two teeth corresponds to a low level of the toothed wheel, and the internal combustion engine further comprises a camshaft position sensor capable of detecting a high or low level of the tooth and of detecting a tooth edge on the basis of a change in level, the sensor having superior detection performance for one type of edge than for the other type of edge, the toothed wheel being mounted on the camshaft so that a main face is oriented towards the camshaft position sensor, the main face oriented towards the position sensor being selected so that:

if the engine includes three cylinders, the three edges spaced apart by 120° are edges of the type for which the detection performance of the sensor is superior, and if the engine includes four cylinders, the four edges spaced apart by 90° are edges of the type for which the detection performance of the sensor is superior.

The invention also relates to a method for assembling an internal combustion engine, comprising a camshaft, a toothed wheel as described above, and a camshaft position sensor of the type capable of detecting a high or low level of the toothed wheel and of detecting a tooth edge on the basis of a change in level, the sensor having superior detection performance for one type of edge than for the other type of edge, the assembly method comprising mounting the toothed wheel on the camshaft so that a main face of the toothed wheel is oriented towards the camshaft position sensor, in which, if the engine includes three cylinders, the main face oriented towards the position sensor is selected so that the three edges spaced apart by 120° are of the type for which the sensor has the best detection performance, and if the engine includes four cylinders, the main face oriented towards the position sensor is the opposite face, so that the four edges spaced apart by 90° are of the type for which the sensor has the best detection performance.

The toothed wheel according to the invention is compatible with three-cylinder engines, as it comprises three edges spaced apart by 120°, and it is compatible with four-cylinder engines as it comprises four edges spaced apart by 90°.

In addition, the edges spaced apart by 120° must all be of the same type, for example rising edge, and the edges spaced apart by 90° must all be of the same other type, for example falling edge, the toothed wheel can have equally satisfactory synchronization performance for both types of engine, even with a camshaft position sensor having better detection for one type of edge in particular, as the toothed wheel can then be positioned relative to the sensor so that the edges to be detected by the sensor (edges spaced apart by 120° or by 90° depending on the type of engine) correspond to the type of edge best detected by the sensor.

The constraint on the types of edges gives the advantage of having a limited number of teeth (four teeth), which offers the advantage of having a reduced target size (as each tooth or hollow between the teeth must be a minimum size to be correctly detected by the sensor).

It is thus not necessary to design and produce different targets for three-cylinder engines and four-cylinder engines.

In addition, the presence of two symmetrical portions devoid of tooth edges and with an angular range of at least 35° makes it possible to ensure that even if the camshaft is offset for a variable valve timing engine, the edge used to control the VVT is not situated in a gap zone. The toothed wheel according to the invention can be used in a variable valve timing engine by positioning the portion devoid of teeth relative to the crankshaft wheel gap so that, even if the camshaft is offset, the crankshaft wheel gap always coincides with the portion devoid of tooth edges. With the engine position based on the analysis of the crankshaft edges, the gap zone generates greater inaccuracy.

DESCRIPTION OF THE DRAWINGS

Further features and advantages of the invention will become more clearly apparent from reading the following description. This description is purely illustrative and should be read with reference to the attached drawings, in which.

DESCRIPTION OF THE EMBODIMENTS

Hereinafter, angles measured in degrees on or relating to an angular position of a camshaft toothed wheel will be denoted as "° CAM", and angles measured in degrees on or relating to an angular position of a crankshaft toothed wheel will be denoted as "° CRK". A rotation of 1° CAM corresponds to a rotation of 2° CRK.

Figure 2A:
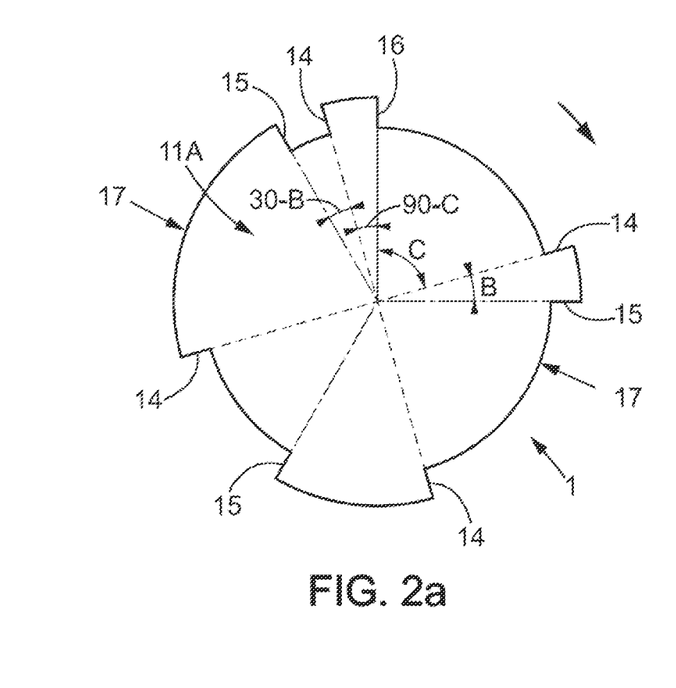
FIGS. 2*a* and 2*b* show two opposite faces of an example of a toothed wheel for a camshaft according to one embodiment of the invention.
Figure 2B:
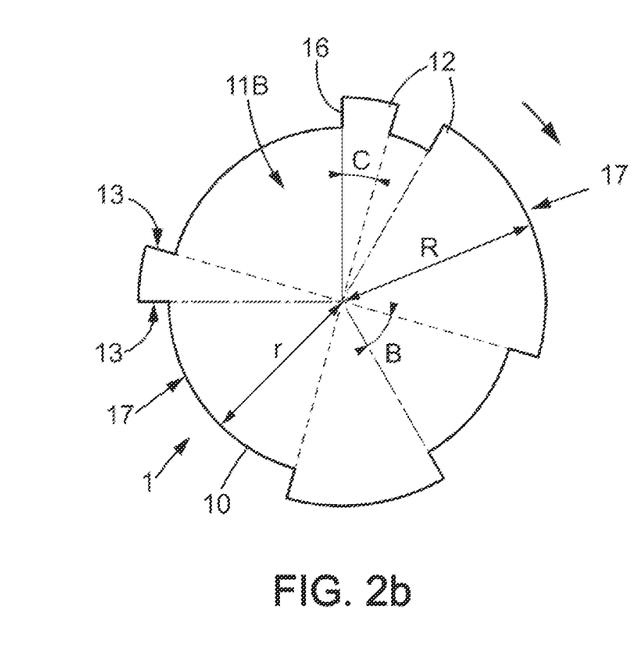

With reference to FIGS. 2*a* and 2*b*, a camshaft toothed wheel 1 will now be described that forms a target for a camshaft angular position sensor 2.

The toothed wheel 1 is generally disc-shaped, that is, it comprises a circular body 10 having two opposite main faces 11A and 11B, these faces being circular, and the wheel comprises a plurality of teeth 12 on the periphery of the circular body 10. Each tooth is delimited by two edges 13 extending substantially radially and that successively form, when the wheel 1 passes in front of a sensor 2, a rising edge and a falling edge.

Whether an edge constitutes a rising edge or a falling edge depends on the side from which the toothed wheel is observed, that is, which main face is observed, and on the direction of rotation of the wheel.

FIGS. 2*a* and 2*b* show an example of a toothed wheel 1 according to one embodiment of the invention, viewed from one side and from the opposite side respectively, that is, considering one and the other of the main faces 11A and 11B, and an arrow also shows the direction of rotation of the wheel that makes it possible to define a tooth edge as being a rising edge or a falling edge.

The toothed wheel 1 has alternately high and low levels, a high level corresponding to a tooth, and a low level corresponding to an interval between two consecutive teeth.

The toothed wheel is suitable for being mounted rigidly on a camshaft of an internal combustion engine for rotation therewith. In order to mount it on the camshaft, a centered, circular through-hole can optionally be made in the toothed wheel.

The toothed wheel 1 is suitable for being used with a TPO (True Power On) sensor 2, or level sensor, that is, a sensor suitable for detecting the high and low levels of the toothed wheel, and for detecting a rising or falling tooth edge on the basis of a change in level.

For example, the sensor 2 can comprise a detection cell (for example such as a Hall-effect cell, magneto-resistive cell, etc.) suitable for detecting a high or low level of the toothed wheel, and an integrated computer suitable for detecting an edge on the basis of a change in high or low level of the toothed wheel.

Such a sensor usually has detection performance—that is, typically, an edge detection accuracy—that is better for one type of edge, often falling edges, than for the other type of edge. An example of a level sensor can have an accuracy of 0.5° CAM in the detection of a falling edge and an accuracy of 1° CAM in the detection of a rising edge.

The toothed wheel 1 advantageously comprises at least four teeth, for example exactly four teeth 12, spaced apart by intervals devoid of teeth.

So that it can be used in conjunction with data obtained from a crankshaft toothed wheel, the camshaft toothed wheel 1 advantageously has a rotational asymmetry, such that the profile of the teeth of any toothed wheel half is different from that of the other half. A tooth detected by the sensor can thus be identified and the state of the engine cycle can be deduced therefrom, in conjunction with angular position data from the crankshaft. In order to obtain this rotational asymmetry, the teeth 12 of the toothed wheel 1 are advantageously all of different sizes.

In addition, the toothed wheel 1 is suitable for being used in three-cylinder engines and four-cylinder engines, having equally satisfactory synchronization performance for both types of engine.

To this end, the four teeth of the toothed wheel 1 are shaped so that, from the same side of the wheel—that is, considering the same main face 11A or 11B—and for the same direction of rotation of the wheel, the toothed wheel 1 has:

Four edges 14 of the same first type, rising or falling, spaced apart by 90° CAM, and Three edges 15 of the same second type, falling or rising respectively, spaced apart by 120° CAM.

The edges 14 spaced apart by 90° CAM form markers associated with respective cylinders of a four-cylinder engine in order to promote the control of the variable valve timing (VVT) in this type of engine, and the edges 15 spaced apart by 120° CAM form markers associated with the respective cylinders of a three-cylinder engine.

In addition, the fact that the edges 15 spaced apart by 120° CAM are not the same type as the edges 14 spaced apart by 90° CAM makes it possible to obtain the same synchronization performance for a four-cylinder engine and a three-cylinder engine.

If the position sensor 2 of the engine has better detection performance for a particular type of edge, for example falling edges, the target can be positioned placing one main face 11 or the other facing the sensor, so that the edges of the type best detected by the sensor correspond to the edges forming the marker of the cylinders for the type of engine in question.

In other words, the target is mounted in one direction on a three-cylinder engine (for example face 11B in FIGS. 2b and 3b) and in the other direction (for example face 11A in FIGS. 2a and 3a) on a four-cylinder engine, if it is assumed that the sensor is configured in the same way.

FIGS. 2a and 2b thus show an example of a toothed wheel 1 viewed respectively from one side and the other, for the same direction of rotation of the wheel.

In FIG. 2a, the four edges 14 spaced apart by 90° CAM are falling edges. Turning the wheel around, in FIG. 2b, the three edges 15 spaced apart by 120° CAM are also falling edges. The wheel is thus reversible.

If the position sensor 2 has better detection accuracy for falling edges, the target is positioned so that the main face 11A shown in FIG. 2a is facing the position sensor 2 for a four-cylinder engine, and the target is positioned so that the main face 11B shown in FIG. 2b is facing the position sensor 2 for a three-cylinder engine.

To facilitate the identification of the face to place facing the sensor depending on the number of cylinders of the engine, a poka-yoke can be placed on at least one of the faces 11A and 11B, that is, a marking that makes it possible to identify the face in relation to the number of cylinders of the engine (the direction of rotation is still the same, as is the type of edge best detected by a TPO sensor).

In one embodiment, the toothed wheel 1 only includes four teeth. In this case, one edge of each tooth forms one of the edges 14 spaced apart by 90°, and the opposite edge of three of the four teeth forms one of the edges 15 spaced apart by 120°.

The remaining edge 16, which is neither one of the edges spaced apart by 90° nor one of the edges spaced apart by 120°, has an angular position that is advantageously suitable for optimizing the synchronization performance of the toothed wheel.

Figure 3A:
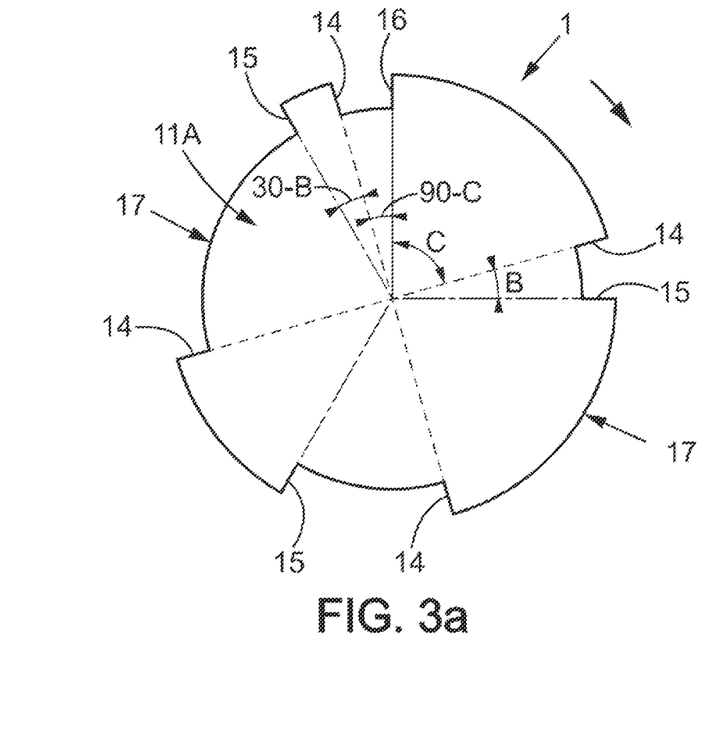
FIGS. 3*a* and 3*b* show two opposite lateral faces of another geometry of toothed wheel having the same edge angular positions as the toothed wheel in FIGS. 2*a* and 2*b*, with the edge types reversed.
Figure 3B:
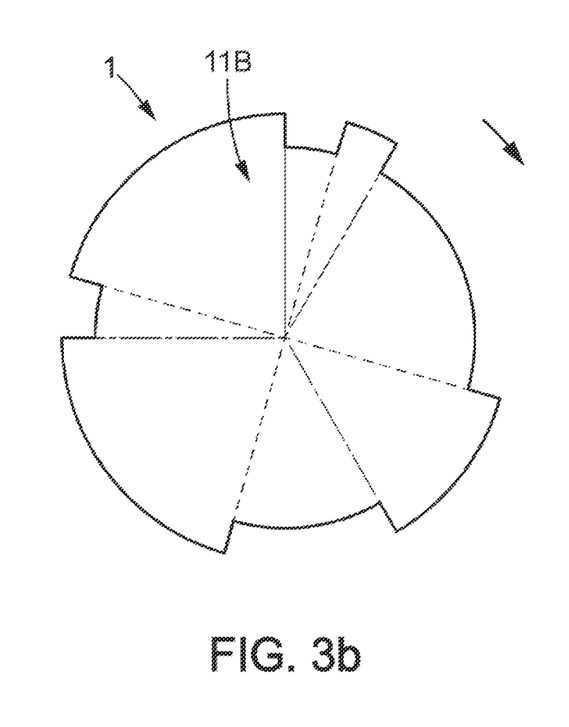

It can be noted that two wheel geometries exist for the same arrangement of the edges, by reversing the type of edge. FIG. 2a thus shows an example in which the edges 14 spaced apart by 90° are falling edges, and FIG. 3a shows an example in which the edges 14 spaced apart by 90° are rising edges. However, all of the angular intervals between the edges are identical.

The minimum angular separation between one of the edges spaced apart by 90° and one of the edges spaced apart by 120° is denoted as B. Given that two geometries exist for each edge arrangement, B can correspond:

to the angular separation between the edges of the smallest tooth of the toothed wheel, the two opposite edges of which comprise one of the edges spaced apart by 90° and one of the edges spaced apart by 120°, if it corresponds to a high level of the wheel (see FIG. 2a), or to the angular separation between the edges defining the smallest interval between two consecutive teeth delimited by tooth edges comprising one of the edges spaced apart by 90° and one of the edges spaced apart by 120°, if it corresponds to a low level of the wheel (see FIG. 3a).

In addition, the minimum angular separation between the "unassigned" edge of the tooth that corresponds neither to one of the edges spaced apart by 120° nor to one of the edges spaced apart by 90° and the closest of the edges spaced apart by 90° is denoted as C. C reflects the angular position of this "unassigned" edge of the tooth.

As with B, the angular separation C can correspond:

to the angular separation of an interval between two teeth formed between the unassigned edge and the closest of the edges spaced apart by 90°, if it corresponds to a low level of the wheel (see FIG. 2a), and to the angular separation between the edges of a tooth comprising the unassigned edge and the closest of the edges spaced apart by 90°, if it corresponds to a high level of the wheel (see FIG. 3a).

If B corresponds to a high level of the wheel, then C corresponds to a low level of the wheel, and vice versa.

With the notations B and C described above, the angular positions of the edges of the teeth making it possible to obtain four edges of a first type spaced apart by 90° and three edges of another type spaced apart by 120° observe the following rule (in ° CAM):

[B, 90, B+120, 180, B+240, 270, 360-C, 360].

B and C are strictly positive and are constrained by the detection performance of the sensor.

The sensor can only detect a high level of the wheel when this high level has a length greater than a threshold, denoted $L_{high}$. $L_{high}$ is therefore the minimum distance between the edges of a tooth allowing the detection of the high level between the edges of the teeth by the sensor.

In addition, the sensor can only detect a low level of the wheel when this low level has a length greater than a threshold, denoted $L_{low}$. $L_{low}$ is therefore the minimum distance between the edges of two consecutive teeth defining an interval allowing the detection of the low level between these edges by the sensor.

By approximation, the lengths considered are those of the segment connecting the high points of the edges of a tooth for $L_{high}$, and those connecting the points at the base of the edges of an interval for $L_{low}$. These segments are also considered to be substantially tangential relative to the circular body.

As a result, when B corresponds to a high level, B must follow the equations below:

$$B > \tan^{-1}\left(\frac{L_{high}}{R}\right) \text{ and } 30 - B > \tan^{-1}\left(\frac{L_{low}}{r}\right)$$

Where R is the radius of the wheel including the height of the tooth relative to the circular body 10, and r is the radius of the circular body of the wheel (see FIG. 2b).

30-B corresponds to the angular interval between the edges defining the smallest interval between two consecutive teeth delimited by tooth edges comprising one of the edges spaced apart by 90° and one of the edges spaced apart by 120°. This interval must be sufficient to allow the detection of a low level, and therefore of the edges defining it.

In this case, C corresponds to a low level and must follow the equations below:

$$C > \tan^{-1}\left(\frac{L_{low}}{r}\right) \text{ and } 90 - C > \tan^{-1}\left(\frac{L_{high}}{R}\right)$$

90-C corresponds to the angle covered by the tooth comprising the unassigned edge.

When B corresponds to a low level, B must verify the equations below:

$$B > \tan^{-1}\left(\frac{L_{low}}{r}\right) \text{ and } 30 - B > \tan^{-1}\left(\frac{L_{high}}{R}\right)$$

C then corresponds to a high level and must verify the equations below:

$$C > \tan^{-1}\left(\frac{L_{low}}{r}\right) \text{ and } 90 - C > \tan^{-1}\left(\frac{L_{high}}{R}\right)$$

90-C then corresponds to the angular separation between the edges of a tooth comprising the unassigned edge and the closest of the edges spaced apart by 90°.

For the toothed wheel 1 to be compatible with a variable valve timing (VVT) engine, it includes on the circumference of the circular body 10 at least two zones 17 devoid of any rising or falling tooth edges respectively over an angle of at least 35° CAM, for example of at least 37.5° CAM (corresponding to 75° CRK for the crankshaft), the two zones 17 being spaced apart by 180° CAM, and one of the two zones is situated in an interval between two teeth, the other zone being situated on a tooth. These two zones 17 are not, however, necessarily the same size.

When the toothed wheel is installed on the camshaft, each zone devoid of tooth edges is positioned in an angular position in which it is detected simultaneously with the detection of the gap of a crankshaft wheel by the corresponding sensor.

Figure 4:
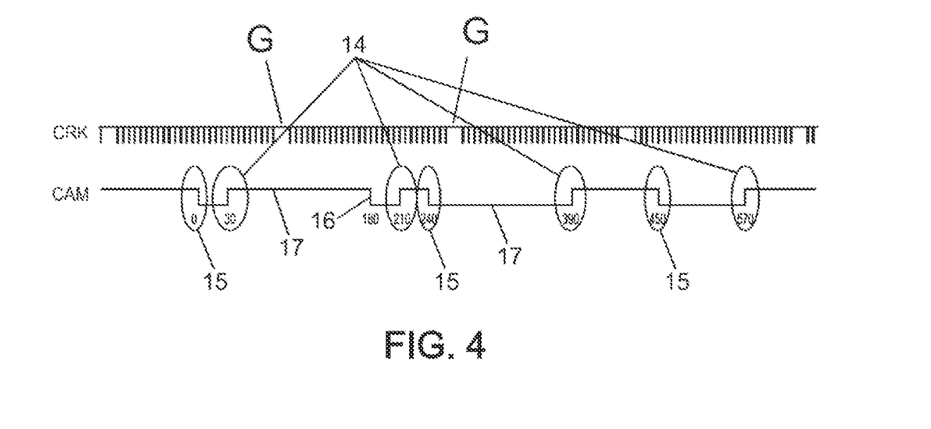
FIG. 4 shows an example of the synchronization of a toothed wheel according to FIGS. 2*a* and 2*b* with a crankshaft toothed wheel.

FIG. 4 compares the teeth of a crankshaft wheel (top line—CRK) including two gap zones G (devoid of teeth) and the teeth of a camshaft toothed wheel (bottom line—CAM, each figure indicated by an arrow representing an angle of rotation value of the crankshaft in ° CRK, the angle of rotation value of the camshaft in ° CAM being equal to half of the value given). The camshaft toothed wheel is therefore positioned so that at least one crankshaft gap zone G corresponds to a portion 17 devoid of tooth edges of the camshaft toothed wheel, and preferably so that the two crankshaft gap zones G correspond respectively to two zones 17 devoid of tooth edges of the camshaft toothed wheel, one of the two zones 17 being situated in an interval between two teeth, the other zone 17 being situated on a tooth.

The amplitude of 35° CAM or more of a zone 17 makes it possible, even if the camshaft is angularly offset to modify the angular opening zones of the intake or exhaust valves, for the zone of the toothed wheel 1 detected by the sensor 2 simultaneously with the detection of the crankshaft gap to always be devoid of edges. The risk of inaccurate marking linked to the detection of an edge simultaneously with the presence of the crankshaft gap is thus avoided.

The presence of two zones 17 spaced apart by 180° CAM results from the fact that one rotation of the camshaft corresponds to two rotations of the crankshaft and therefore the crankshaft gap corresponds to two zones of the toothed wheel spaced apart by 180° CAM.

If the crankshaft wheel includes two gap zones spaced apart by 180° CRK, the camshaft toothed wheel advantageously has four zones devoid of tooth edges over an angle of at least 35° CAM, spaced apart by 90° CAM.

FIG. 4 also identifies the three edges 15 spaced apart by 120° CAM, which are in this case falling edges, and the four edges 14 spaced apart by 90° CAM, which are rising edges.

Figure 5:
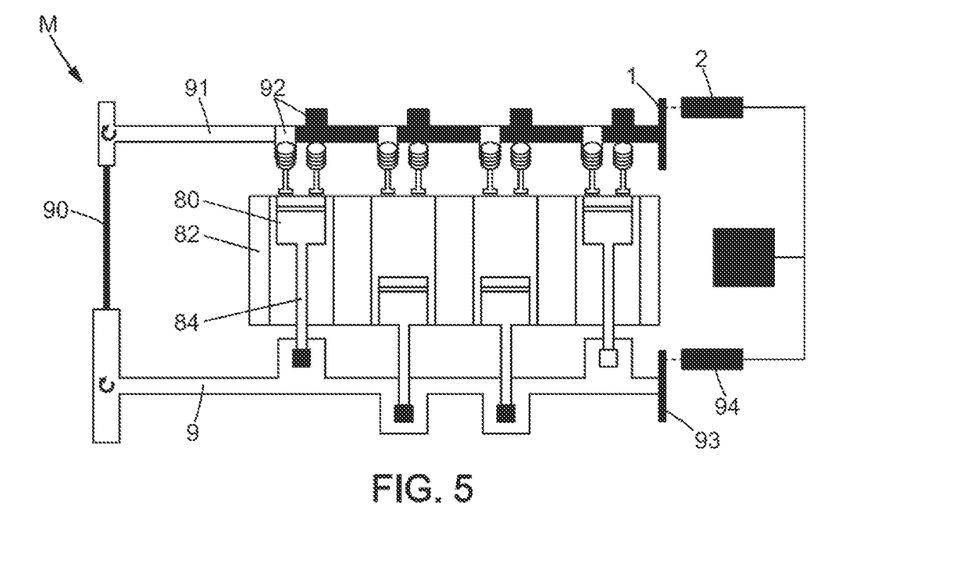
FIG. 5 shows an example of a four-cylinder engine comprising a toothed wheel for a camshaft according to one embodiment of the invention.

FIG. 5 is schematic representation of an example of an internal combustion engine comprising a toothed wheel according to the description above.

The engine M comprises three or four cylinders 82, in which respective pistons 80 slide by means of connecting rods 84 driven by a crankshaft 9. The crankshaft 9 also rotates, by means of a timing belt 90, at least one camshaft 91, the rotation of which successively opens and closes intake and exhaust valves 92.

The engine can have variable valve timing: in this case, it comprises means (not shown) for angularly offsetting the camshaft to modify the opening times of the valves relative to an identical position of the crankshaft. The maximum offset angle is in the region of 25° CAM (or 50° CRK).

The crankshaft 9 includes a toothed wheel 93 comprising a set of teeth evenly distributed around its circumference, typically 36 or 60 teeth, with the exception of one or two gap zones, typically with one or two missing teeth.

A crankshaft angular position sensor 94 is positioned facing the toothed wheel 93 and is suitable for detecting the passage of each tooth of the wheel.

A toothed wheel 1 as described above is mounted on the camshaft 91 or on each camshaft. A TPO or level sensor 2 is positioned in front of the toothed wheel and is suitable for detecting the levels of the toothed wheel and for deducing a rising or falling edge from a change in level.

As mentioned above, the sensor 2 can have superior detection performance for one type of edge than for the other type of edge.

The reversible toothed wheel is in this case advantageously positioned, on the camshaft, on assembly of the engine, orienting one of its main faces towards the sensor 2 so that:

if the engine includes three cylinders, the three edges spaced apart by 120° correspond to the type of edge for which the sensor 2 has superior performance, and if the engine includes four cylinders, the four edges spaced apart by 90° correspond to the type of edge for which the sensor 2 has superior performance.

The engine also comprises a central processing unit suitable for receiving the detection signals from the angular position sensors of the crankshaft and the camshaft, and for deducing a state of the engine cycle therefrom at all times.

As stated above with reference to FIG. 4, if the engine is a variable valve timing engine, the camshaft toothed wheel is advantageously positioned, on assembly of the engine, so that the range of the engine cycle during which the reference space devoid of teeth of the crankshaft toothed wheel is facing the crankshaft angular position sensor 94 is included in the range of the engine cycle during which a portion of at least 30° CAM devoid of teeth of the camshaft toothed wheel is facing the camshaft angular position sensor 2.

The invention claimed is:

1. A toothed wheel (1) for a camshaft, forming a target for a camshaft position sensor (2), the toothed wheel comprising a circular body (10) comprising two opposite main faces (11A, 11B), and at least four teeth (12) distributed around the circumference of the circular body, each tooth comprising two edges (13), one corresponding to a rising edge and the other to a falling edge, according to a direction of rotation of the wheel, wherein said at least four teeth are shaped so that the toothed wheel comprises, considering the same main face (11A, 11B) and the same direction of rotation of the wheel:

four edges (14) of the same first rising or falling type spaced apart by 90° respectively, and three edges (15) of the second falling or rising type respectively, spaced apart by 120° respectively, and wherein the toothed wheel circumference comprises at least two zones devoid of any rising or falling tooth edges respectively over an angle of at least 35°, the two zones being spaced apart by 180°, one of the two zones being situated in an interval between two teeth and the other zone being situated on a tooth.

2. The toothed wheel as claimed in claim 1, in which the angular separation between the edges (13) of each tooth (12) is different for each tooth.

3. The toothed wheel as claimed in claim 2, comprising a marking element on one of the two opposite main faces (11A, 11B).

4. The toothed wheel (1) as claimed in claim 2, in which, with the minimum angular separation between one of the four edges (14) spaced apart by 90° and one of the three edges (15) spaced apart by 120° denoted as B, and the minimum angular separation between one of the four edges (14) spaced apart by 90° and the fourth edge (16) of the same type as those (15) spaced apart by 120° denoted as C, the angular positions of the edges of the teeth of the toothed wheel are:

[B, 90, B+120, 180, B+240, 270, 360-C, 360].

5. An internal combustion engine (M) comprising three or four cylinders, comprising a camshaft, a toothed wheel according to claim 2 rigidly mounted on the camshaft, in which each tooth corresponds to a high level of the toothed wheel and each interval between two teeth corresponds to a low level of the toothed wheel, and the internal combustion engine further comprises a camshaft position sensor capable of detecting a high or low level of the tooth and of detecting a tooth edge on the basis of a change in level, the sensor having superior detection performance for one type of edge than for the other type of edge, the toothed wheel (1) being mounted on the camshaft so that a main face is oriented towards the camshaft position sensor (2), the main face (11A, 11B) oriented towards the position sensor (2) being selected so that:

if the engine includes three cylinders, the three edges (15) spaced apart by 120° are edges of the type for which the detection performance of the sensor is superior, and if the engine includes four cylinders, the four edges (14) spaced apart by 90° are edges of the type for which the detection performance of the sensor is superior.

6. The toothed wheel as claimed in claim 1, comprising a marking element on one of the two opposite main faces (11A, 11B).

7. The toothed wheel (1) as claimed in claim 6, in which, with the minimum angular separation between one of the four edges (14) spaced apart by 90° and one of the three edges (15) spaced apart by 120° denoted as B, and the minimum angular separation between one of the four edges (14) spaced apart by 90° and the fourth edge (16) of the same type as those (15) spaced apart by 120° denoted as C, the angular positions of the edges of the teeth of the toothed wheel are:

[B, 90, B+120, 180, B+240, 270, 360-C, 360].

8. An internal combustion engine (M) comprising three or four cylinders, comprising a camshaft, a toothed wheel according to claim 6 rigidly mounted on the camshaft, in which each tooth corresponds to a high level of the toothed wheel and each interval between two teeth corresponds to a low level of the toothed wheel, and the internal combustion engine further comprises a camshaft position sensor capable of detecting a high or low level of the tooth and of detecting a tooth edge on the basis of a change in level, the sensor having superior detection performance for one type of edge than for the other type of edge, the toothed wheel (1) being mounted on the camshaft so that a main face is oriented towards the camshaft position sensor (2), the main face (11A, 11B) oriented towards the position sensor (2) being selected so that:

if the engine includes three cylinders, the three edges (15) spaced apart by 120° are edges of the type for which the detection performance of the sensor is superior, and if the engine includes four cylinders, the four edges (14) spaced apart by 90° are edges of the type for which the detection performance of the sensor is superior.

9. The toothed wheel (1) as claimed in claim 1, in which, with the minimum angular separation between one of the four edges (14) spaced apart by 90° and one of the three edges (15) spaced apart by 120° denoted as B, and the minimum angular separation between one of the four edges (14) spaced apart by 90° and the fourth edge (16) of the same type as those (15) spaced apart by 120° denoted as C, the angular positions of the edges of the teeth of the toothed wheel are:

[B, 90, B+120, 180, B+240, 270, 360−C, 360].

10. The toothed wheel (1) as claimed in claim 9, in which each tooth (12) corresponds to a high level of the toothed wheel and each interval between two teeth corresponds to a low level of the toothed wheel, the toothed wheel being suitable for forming a target for a camshaft position sensor (2) of the type capable of detecting a high or low level of the tooth and for deducing the presence of a tooth edge from a change in level, and the minimum angular separation B corresponds to a high level of the toothed wheel, and is defined by the following equations:

$$B > \tan^{-1}\left(\frac{L_{high}}{R}\right) \text{ and } 30 - B > \tan^{-1}\left(\frac{L_{low}}{r}\right)$$

where R is the radius of the toothed wheel including a height of the teeth relative to the circular body, r is the radius of the circular body, $L_{high}$ is the minimum distance between the edges of a tooth allowing the detection of the high level between the two edges by the sensor, and $L_{low}$ is the minimum distance between the edges of two consecutive teeth defining an interval allowing the detection of the low level between these edges by the sensor.

11. The toothed wheel (1) as claimed in the preceding claim 10, in which the angular separation C corresponds to a low level of the toothed wheel, and C is defined by the following equations:

$$C > \tan^{-1}\left(\frac{L_{low}}{r}\right) \text{ and } 90 - C > \tan^{-1}\left(\frac{L_{high}}{R}\right).$$

12. An internal combustion engine (M) comprising three or four cylinders, comprising a camshaft, a toothed wheel according to claim 11 rigidly mounted on the camshaft, in which each tooth corresponds to a high level of the toothed wheel and each interval between two teeth corresponds to a low level of the toothed wheel, and the internal combustion engine further comprises a camshaft position sensor capable of detecting a high or low level of the tooth and of detecting a tooth edge on the basis of a change in level, the sensor having superior detection performance for one type of edge than for the other type of edge, the toothed wheel (1) being mounted on the camshaft so that a main face is oriented towards the camshaft position sensor (2), the main face (11A, 11B) oriented towards the position sensor (2) being selected so that:

if the engine includes three cylinders, the three edges (15) spaced apart by 120° are edges of the type for which the detection performance of the sensor is superior, and if the engine includes four cylinders, the four edges (14) spaced apart by 90° are edges of the type for which the detection performance of the sensor is superior.

13. An internal combustion engine (M) comprising three or four cylinders, comprising a camshaft, a toothed wheel according to claim 10 rigidly mounted on the camshaft, in which each tooth corresponds to a high level of the toothed wheel and each interval between two teeth corresponds to a low level of the toothed wheel, and the internal combustion engine further comprises a camshaft position sensor capable of detecting a high or low level of the tooth and of detecting a tooth edge on the basis of a change in level, the sensor having superior detection performance for one type of edge than for the other type of edge, the toothed wheel (1) being mounted on the camshaft so that a main face is oriented towards the camshaft position sensor (2), the main face (11A, 11B) oriented towards the position sensor (2) being selected so that:

if the engine includes three cylinders, the three edges (15) spaced apart by 120° are edges of the type for which the detection performance of the sensor is superior, and if the engine includes four cylinders, the four edges (14) spaced apart by 90° are edges of the type for which the detection performance of the sensor is superior.

14. The toothed wheel (1) as claimed in the claim 9, in which each tooth corresponds to a high level of the toothed wheel and each interval between two teeth corresponds to a low level of the toothed wheel, the toothed wheel being suitable for forming a target for a camshaft position sensor of the type capable of detecting a high or low level of the toothed wheel and for detecting a tooth edge on the basis of a change in level, and the minimum angular separation B corresponds to a low level of the toothed wheel, and is defined by the following equations:

$$B > \tan^{-1}\left(\frac{L_{low}}{r}\right) \text{ and } 30 - B > \tan^{-1}\left(\frac{L_{high}}{R}\right)$$

where r is the radius of the circular body, R is the radius of the toothed wheel including a height of the teeth relative to the circular body, $L_{high}$ is the minimum distance between the edges of a tooth allowing the detection of the high level between the two edges by the sensor, and $L_{low}$ is the minimum distance between the edges of two consecutive teeth defining an interval allowing the detection of the low level between these edges by the sensor.

15. The toothed wheel as claimed in claim 14, in which the angular separation C corresponds to a high level of the toothed wheel, and C is defined by the following equations:

$$C > \tan^{-1}\left(\frac{L_{high}}{R}\right) \text{ and } 90 - C > \tan^{-1}\left(\frac{L_{low}}{r}\right).$$

16. An internal combustion engine (M) comprising three or four cylinders, comprising a camshaft, a toothed wheel according to claim 15 rigidly mounted on the camshaft, in which each tooth corresponds to a high level of the toothed wheel and each interval between two teeth corresponds to a low level of the toothed wheel, and the internal combustion engine further comprises a camshaft position sensor capable of detecting a high or low level of the tooth and of detecting a tooth edge on the basis of a change in level, the sensor having superior detection performance for one type of edge than for the other type of edge,
  the toothed wheel (1) being mounted on the camshaft so that a main face is oriented towards the camshaft position sensor (2),
  the main face (11A, 11B) oriented towards the position sensor (2) being selected so that:
    if the engine includes three cylinders, the three edges (15) spaced apart by 120° are edges of the type for which the detection performance of the sensor is superior, and
    if the engine includes four cylinders, the four edges (14) spaced apart by 90° are edges of the type for which the detection performance of the sensor is superior.

17. An internal combustion engine (M) comprising three or four cylinders, comprising a camshaft, a toothed wheel according to claim 14 rigidly mounted on the camshaft, in which each tooth corresponds to a high level of the toothed wheel and each interval between two teeth corresponds to a low level of the toothed wheel, and the internal combustion engine further comprises a camshaft position sensor capable of detecting a high or low level of the tooth and of detecting a tooth edge on the basis of a change in level, the sensor having superior detection performance for one type of edge than for the other type of edge,
  the toothed wheel (1) being mounted on the camshaft so that a main face is oriented towards the camshaft position sensor (2),
  the main face (11A, 11B) oriented towards the position sensor (2) being selected so that:
    if the engine includes three cylinders, the three edges (15) spaced apart by 120° are edges of the type for which the detection performance of the sensor is superior, and
    if the engine includes four cylinders, the four edges (14) spaced apart by 90° are edges of the type for which the detection performance of the sensor is superior.

18. An internal combustion engine (M) comprising three or four cylinders, comprising a camshaft, a toothed wheel according to claim 9 rigidly mounted on the camshaft, in which each tooth corresponds to a high level of the toothed wheel and each interval between two teeth corresponds to a low level of the toothed wheel, and the internal combustion engine further comprises a camshaft position sensor capable of detecting a high or low level of the tooth and of detecting a tooth edge on the basis of a change in level, the sensor having superior detection performance for one type of edge than for the other type of edge,
  the toothed wheel (1) being mounted on the camshaft so that a main face is oriented towards the camshaft position sensor (2),
  the main face (11A, 11B) oriented towards the position sensor (2) being selected so that:
    if the engine includes three cylinders, the three edges (15) spaced apart by 120° are edges of the type for which the detection performance of the sensor is superior, and
    if the engine includes four cylinders, the four edges (14) spaced apart by 90° are edges of the type for which the detection performance of the sensor is superior.

19. An internal combustion engine (M) comprising three or four cylinders, comprising a camshaft, a toothed wheel according to claim 1, rigidly mounted on the camshaft, in which each tooth corresponds to a high level of the toothed wheel and each interval between two teeth corresponds to a low level of the toothed wheel, and the internal combustion engine further comprises a camshaft position sensor capable of detecting a high or low level of the tooth and of detecting a tooth edge on the basis of a change in level, the sensor having superior detection performance for one type of edge than for the other type of edge,
  the toothed wheel (1) being mounted on the camshaft so that a main face is oriented towards the camshaft position sensor (2),
  the main face (11A, 11B) oriented towards the position sensor (2) being selected so that:
    if the engine includes three cylinders, the three edges (15) spaced apart by 120° are edges of the type for which the detection performance of the sensor is superior, and
    if the engine includes four cylinders, the four edges (14) spaced apart by 90° are edges of the type for which the detection performance of the sensor is superior.

20. A method for assembling an internal combustion engine, comprising a camshaft, a toothed wheel (1) as claimed in claim 1, and a camshaft position sensor (2) of the type capable of detecting a high or low level of the toothed wheel and of detecting a tooth edge on the basis of a change in level, the sensor having superior detection performance for one type of edge than for the other type of edge,
  the assembly method comprising mounting the toothed wheel on the camshaft so that a main face (11A, 11B) of the toothed wheel is oriented towards the camshaft position sensor (2),
  in which, if the engine includes three cylinders, the main face (11A, 11B) oriented towards the position sensor is selected so that the three edges (15) spaced apart by 120° are of the type for which the sensor has the best detection performance, and
  if the engine includes four cylinders, the main face oriented towards the position sensor is the opposite face, so that the four edges (14) spaced apart by 90° are of the type for which the sensor has the best detection performance.

* * * * *